United States Patent [19]

Riegelman

[11] 4,158,272
[45] Jun. 19, 1979

[54] VEHICLE WINDOW WITH NON-REMOVABLE SASH IN CURVED FRAME

[75] Inventor: Harry M. Riegelman, Fullerton, Calif.

[73] Assignee: Rusco Industries, Inc., Fullerton, Calif.

[21] Appl. No.: 902,042

[22] Filed: May 2, 1978

Related U.S. Application Data

[63] Continuation-in-part of Ser. No. 830,656, Sep. 6, 1977.

[51] Int. Cl.² .............................................. E05D 15/16
[52] U.S. Cl. ........................................ 49/431; 49/404
[58] Field of Search ................. 49/431, 404, 433, 425; 160/185–187, 206

[56] References Cited

U.S. PATENT DOCUMENTS

| | | | |
|---|---|---|---|
| 1,658,317 | 2/1928 | Wight et al. | 49/433 X |
| 2,596,433 | 5/1952 | Potts | 160/206 |
| 3,693,293 | 9/1972 | Egan et al. | 49/425 X |

Primary Examiner—Philip C. Kannan
Attorney, Agent, or Firm—Perry E. Turner

[57] ABSTRACT

There is shown a frame in a truck cab which has an elongated lower straight portion, an elongated shorter upper portion that is curved or bowed upwards, and side portions extending between the ends of such lower and upper portions, and sashes movable along the lower portion. Fixed panes are positioned in the end portions of the frame, and the sashes are slidable so their upper ends move apart a significant distance before engaging the upper frame portion, and such distance is sufficient that in their closed positions the sashes have greater headroom in the upper frame section than the depth to which their lower ends extend into the lower frame section. Such sashes are non-removable via U-shaped or box-like guide elements secured to their lower ends, such elements having spring-like walls with flanges which extend laterally below and in interference relation with shoulder ribs in the frame. The flanges have cam surfaces to facilitate insertion of the guide elements in the frame for locking relation therewith during assembly of the window structure.

10 Claims, 12 Drawing Figures

VEHICLE WINDOW WITH NON-REMOVABLE SASH IN CURVED FRAME

CROSS-REFERENCE TO RELATED APPLICATION

This application is a continuation-in-part of my application, VEHICLE WINDOW WITH NON-REMOVABLE SASH IN CURVED FRAME, Ser. No. 830,656, filed Sept. 6, 1977, now abandoned.

BACKGROUND OF THE INVENTION

1. Field of the Invention

This invention relates to sliding windows and panels for vehicles.

2. Description of the Prior Art

As heretofore known, window structures for vehicles often have non-rectangular frames such as curved frames, as in the rear windows of truck cabs, and such frames have not been practical configurations for sliding panels or sashes from the standpoint of security. In this regard, if a rectangular window is slidable on the straight bottom section of a frame that has a curved upper section, latching it in closed position from the inside merely prevents it from being moved horizontally from the outside. However, the headroom between its upper rail and the top of the upper frame section permits it to be lifted clear of the lower frame section and be removed. Avoidance of this result has necessitated limiting such headroom and thereby limiting sliding sash movement too severely. Such window structures are more expensive than fixed windows without sashes, but do not provide desired advantages of such fixed windows.

SUMMARY OF THE INVENTION

This invention embraces a window with a sash slidable between straight and curved frame sections, with guide and anit-lift means carried by the sash and interlocked with the frame. Also embraced is anti-lift means in the forms of elements secured to the lower rail of a sash and having flanges to extend into and interlock with portions of the frame. Further, the invention embraces such flanges with spring-like legs or walls and with cam surfaces on the flanges, whereby after securing the elements to the lower rails of the sash and positioning the flanges against the edges of the walls of the frame and applying force to assemble the sash in place, the flanges are caused to be cammed inward so as to ride along the inner surfaces of the walls until they pass shoulders in the frame and spring out to interlock therewith.

DESCRIPTION OF ILLUSTRATIVE EMBODIMENTS

Figure 1:
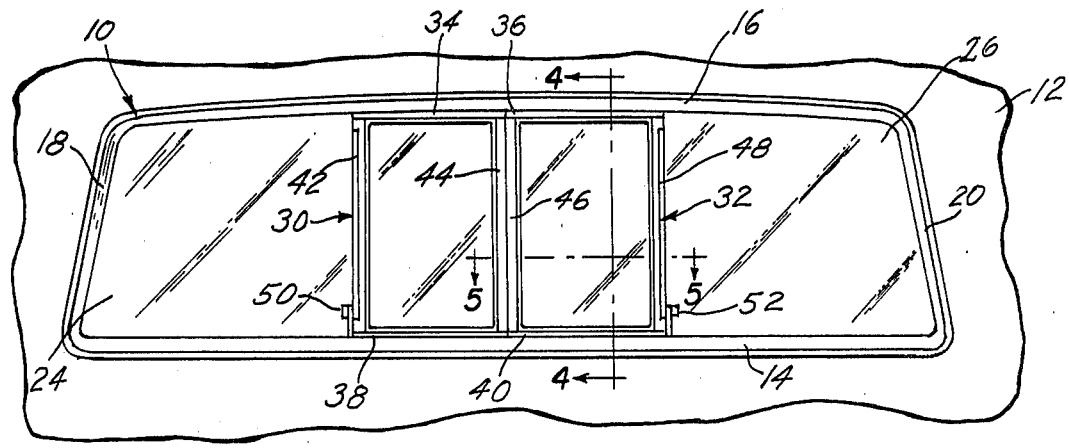
FIG. 1 is a view in elevation of a window in accordance with the invention, showing a pair of sashes slidable between a lower straight frame section and an upper curved frame section.

Referring to FIG. 1, there is shown a window structure 10 mounted in an opening in a support structure 12 such as the rear panel of a truck cab. The window structure 10 includes a frame having a straight, horizontal lower section 14 and an upper curved section 16, with end sections 18, 20 extending between the ends of the straight and curved sections 14, 16. The frame carries stationary panes 24, 26 in its end portions, such fixed panes following the contrours of the frame including that of the upper portions of the curved section 16 in which the upper edges of such panes extend.

The frame also supports rectangular panels or sashes 30, 32 for horizontal movement. In this regard, the sashes have their upper rails 34, 36 extending into and in gliding relation to the upper curved frame section 16, and their lower railes 38, 40 similarly slidable in the lower frame section 14. The sash 30 has its rails 34, 38 secured to stiles 42, 44, and the sash 32 has its rails 36, 40 secured to stiles 46, 48. The outer stiles 42, 48 of the sashes slidably support respective latches 50, 52 which are adapted to extend into openings in the straight frame section 14 and interlock therewith in the closed positions of the sashes. The latches are on the inside so that in their latched positions the sashes cannot be moved horizontally by anyone on the outside.

Figure 4:
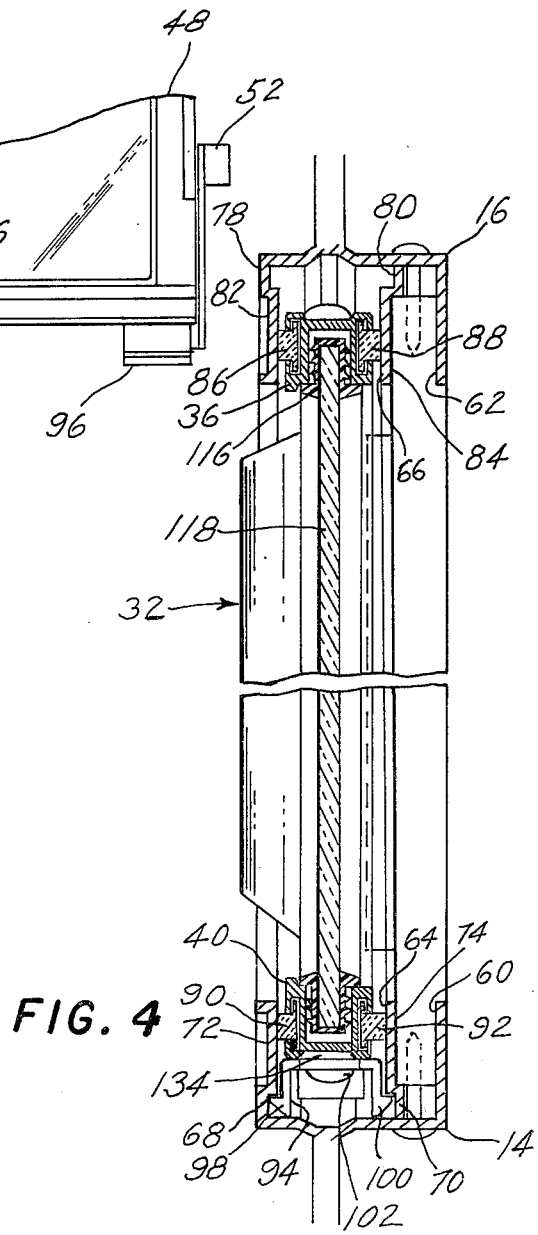
FIG. 4 is a fragmentary sectional view taken along the line 4—4 of FIG. 1.

Referring to FIG. 4 along with FIG. 1, the sashes and frame cooperate to insure that the sashes cannot be lifted vertically from either the outside or inside, whereby the sashes cannot be removed from the frame when they are latched in closed position. The parts also cooperate to insure smooth guiding of the sashes horizontally when the latches are lifted and force is applied to move the sashes along the frame. In this regard, the frame sections are extruded members and preferably have the same cross-section in the interest of economy of manufacture and assembly. As shown in FIG. 4, the frame sections 14, 16 have outer channels 60, 62 in which the stationary panes 24, 26 are mounted, and channels 64, 66 in which the lower and upper rails of the sashes are located.

With respect to the channels 64, 66 for the sashes, they have inner and outer portions wherein the channel walls of the outer portions are more closely spaced than the inntter portions. Thus, section 14 has inner wall portions 68, 70 and outer wall portions 72, 74, and section 16 has inner wall portions 78, 80 and outer wall portions 82, 84. The outer wall portions are relatively wide compared to the inner wall portions, and such wider walls are sufficiently deep to accommodate the rails of the sashes and weatherstripping carried thereby. As illustrated in FIG. 4 for the sash 32, the rails 36, 40 are extruded elements having narrow T-shaped grooves in their sides in which the lips of weatherstrips are captured. Thus, weatherstrips 86, 88 are carried by the upper rail 36, and weatherstrips 90, 92 are carried by the lower rail 40, such weatherstrips extending into sliding and sealing engagement with the adjacent surfaces of the outer wall of the section.

Figure 2:
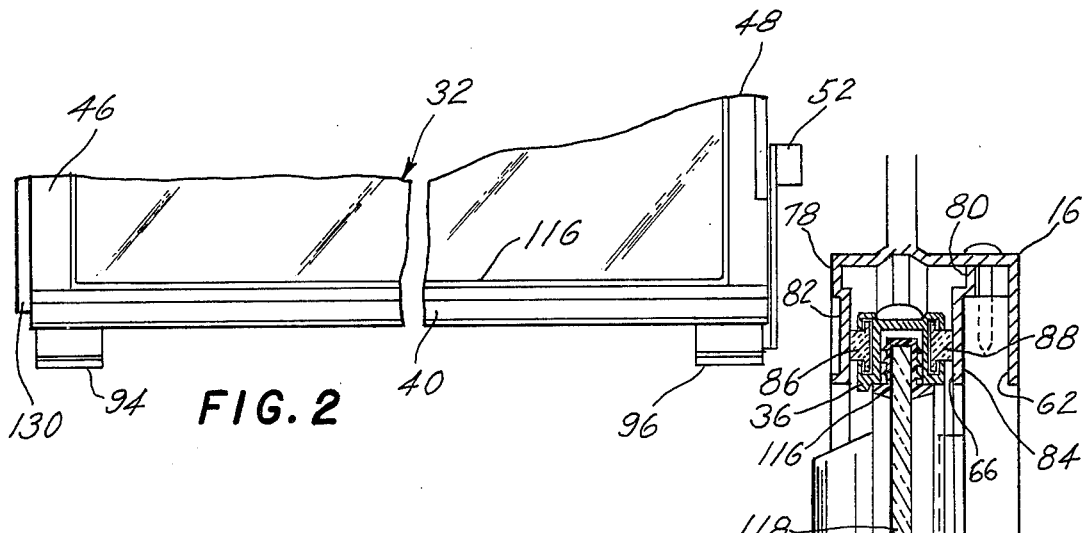
FIG. 2 is a fragmentary front view of one of the sashes, showing the guide and anti-lift element secured to the lower rail thereof.
Figure 3:
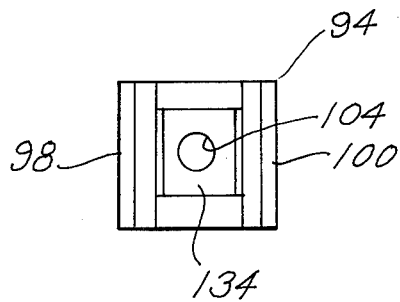
FIG. 3 is a top plan view of one of the guide and anti-lift elements of the invention.
Figure 5:
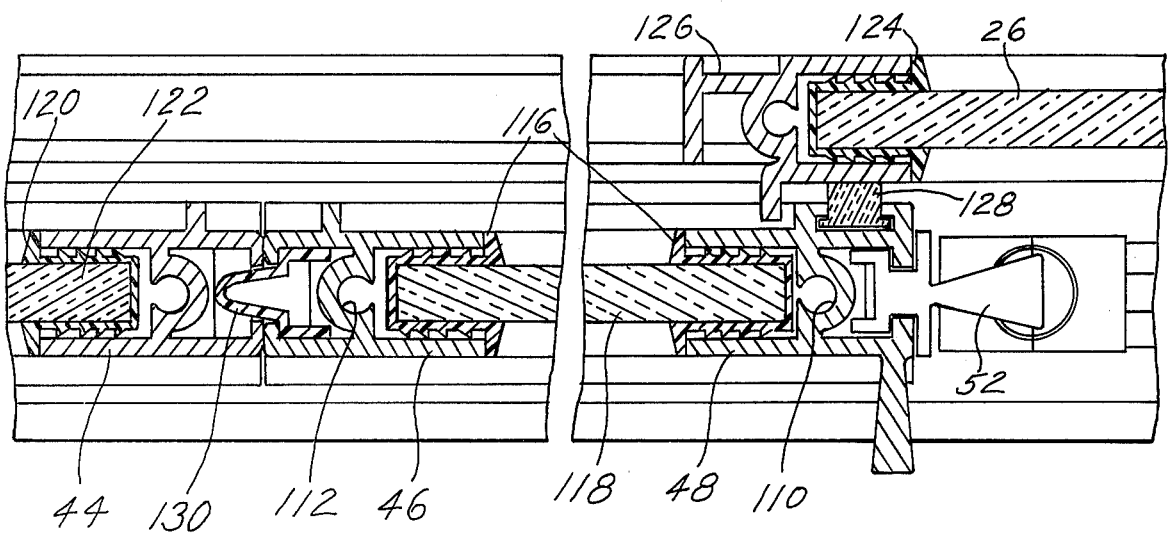
FIG. 5 is a fragmentary sectional view taken along the line 5—5 of FIG. 1.

Referring to FIGS. 2 and 3 along with FIGS. 1 and 4, the sashes are additionally provided with combination guide and anti-lift means, which in one embodiment is in the form of spaced U-shaped elements 94, 96 (FIG. 2). As best seen in the lower portion of FIG. 4 for the element 94, the legs or side walls of such element terminate in flanges 98, 100 which extend below the shoulder transitions between the inner and outer wall portions of the channel 64. Such flanges are shaped to be in interfering relation with these shoulder transitions and thereby interlocked with the frame section 14. Such elements are suitably fastened to the bottom surface of the lower rail 40, as by a respective threaded fastener 102 which extends through a central opening 104 in the element (FIG. 3) and through the lower rail to threadedly engage and be securely fastened to the stile. To this end, the stile preferably has an integral thread groove. In this embodiment, such thread groove is shown at 110 in FIG. 5, and it will be understood that the top rail of the sash 32 is similarly secured to the stile 48. Also shown in FIG. 5 is a threaded groove 112 via which a threaded fastener secures the top rail to the stile 46, and the element 96 and left end of the lower rail 40 (FIG. 2) are similarly secured to the stile 46, as for the element 94.

The glazing is done via extruded gasket strips, as shown at 116 for a strip fitted around the edges of the pane 118, and at 120 for the strip fitted around the edges of the pane 122. In the preferred form, such strips have serrations along their lateral surfaces for snug, cushioning engagement with the inner walls of the stiles and rails of the sashes. Also, the fixed or stationary panes are similarly fitted in place, as via such a gasket 124 shown around the edge of the pane 26 in FIG. 5. Further, the edge of the pane 26 extending vertically is supported in a vertical stile 126, and in the closed position of the adjacent sash 32 the inner surface of such stile 126 is sealingly engaged by weatherstrip 128 carried by the outer face of the stile 48.

Provision is also made for a seal at the abutting faces of the stiles 44, 46 of the sashes 30, 32. Referring again to FIG. 5, there is an extruded gasket strip 130 that is supported by one of the stiles 46, and which has a portion extending past the face of such stile 46 and the groove in the face of the adjacent stile 44 of the other sash. Thus, when the sashes are moved to closed position and latched, they are appropriately sealed against entry of dirt or moisture at all points.

The window structure above described is one in which the guide elements carried by the sashes are effective to prevent their being lifted and removed in that manner, and at the same time facilitates the smooth horizontal movement of the sashes when they are grasped for such movement. Further, this construction greatly facilitates assembly of the sashes. In this regard, the flanged walls of the U-shaped elements preferably are spring-like, and such elements may be made of any suitable material. Preferably, such elements are molded plastic, e.g., delrin or other material having long wearing qualities. While the upper surfaces of the flanges are at right angles to the legs or walls from which they extend, the lower surfaces of the flanges are preferably tapered as shown in FIG. 4. Such surfaces act as cam surfaces when assembling a sash in place.

In this latter regard, after the elements 94, 96 are fastened in place at the bottom of the lower rail 40 as shown in FIG. 2, and the sash is otherwise completed, it is readily positioned in place in the straight frame section 14 by locating the cam surfaces of the elements against the outer edges of the walls 72, 74 and applying force downwardly. Such downward force cause the legs to be cammed inwardly, and the edges of the flanges ride along the inner surfaces of such walls until they reach the space between the inner walls 68, 70. Upon clearing the sharp shoulder transitions, the flanges of the elements are caused by the spring action of the legs to snap outwardly. The upper frame section can then be fitted over the upper rails of the sashes after both of them have been positioned in the straight frame section in this manner. In this regard, the window may be one that needs only one sash, and it will be understood that this invention embraces the structure above described with any desired number of movable panels or sashes.

Assembly is also facilitated by forming the rails and elements 94, 96 with cooperative contours. In this matter, inspection of FIG. 4 shows that the bottom face of the rail 40 has a shallow channel with sloping sides, and that the element 94 has a central boss with sloping sides that nests in such channel, such boss being shown at 134 in FIGS. 3 and 4. Thus, in assembly the element can readily be seated and fastened in place, and thereafter its nested relation with the rail prevents it from being dislodged or rotated when it is cammed into place in the straight section 14 as above described.

FIGS. 6-12 illustrate another embodiment of guide and anti-lift element of this invention, wherein the walls from which the flanges extend can be substantially thinner than in the U-shaped element shown in FIGS. 2-4, and yet have greater reliability for anti-lift purposes. In this regard, the element of FIGS. 2-4 cannot have a center portion that is very wide, i.e. that extends substantially from the edges of the boss 134, and which is very thin and flexible. As will be apparent, a substantial lifting force on such a wide, flexible center portion will cause it to deform and permit the flanges to be forced out of interlocking position with the frame. This prospect is eliminated with the guide and anti-lift element of FIGS. 6-12.

The element of FIGS. 6-12 is a box-like structure 140 that is formed as a rectangular shell with thin end walls 142, 144 and side walls 146, 148. The side walls 146, 148 are formed with integral flanges 150, 152 at their lower edges which are centered along such edges. The flanges are shaped as the flanges in the embodiment of FIGS. 2-4, and will be seen to function as described for that embodiment.

Figure 6:
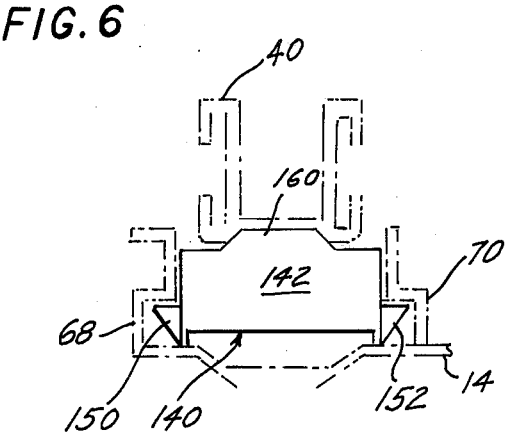
FIG. 6 is an end view of another form of guide and anti-lift element of the invention, showing in phantom the portion of the sash to which the element is secured and the portion of the lower frame with which the element interlocks.
Figure 7:
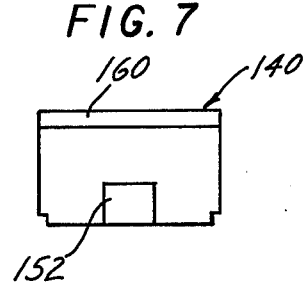
FIG. 7 is a side view of the element of FIG. 6.

Extending between the upper edges of the end walls 142, 144 is a relatively thick boss or seat 160 having inclined sides for nesting relation with the bottom of the rail 40 of the sash as shown in FIG. 6. The boss 160 has a central opening 162 for threaded engagement by a screw fastener inserted through the element and into the stile for securing the element in position. If desired, the element may be molded with voids 166, 168 (FIG. 9) so that the portion of greatest thickness is that in which the fastener-receiving opening 162 is located.

Figure 8:
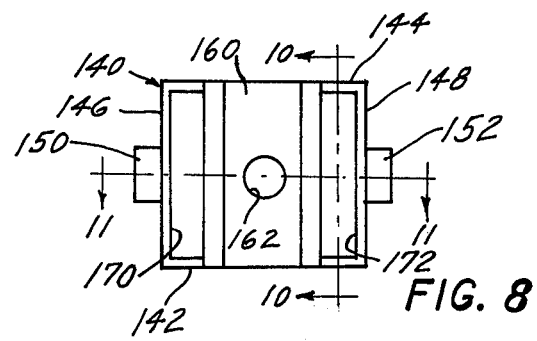
FIG. 8 is a top view of the element of FIG. 6.
Figure 10:
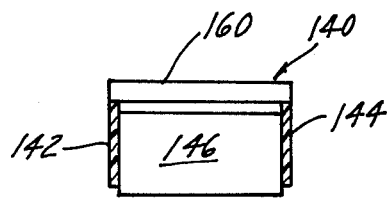
FIG. 10 is a sectional view taken along the line 10—10 of FIG. 8.
Figure 9:
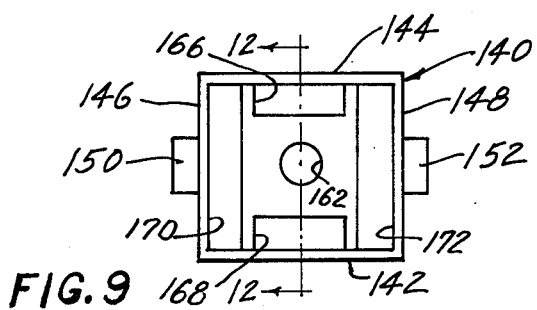
FIG. 9 is a bottom view of the element of FIG. 6.
Figure 12:
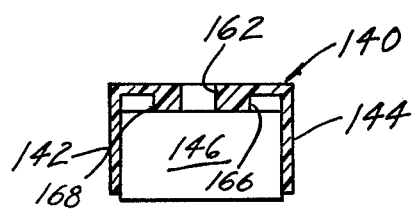
FIG. 12 is a sectional view taken along the line 12—12 of FIG. 9.
Figure 11:
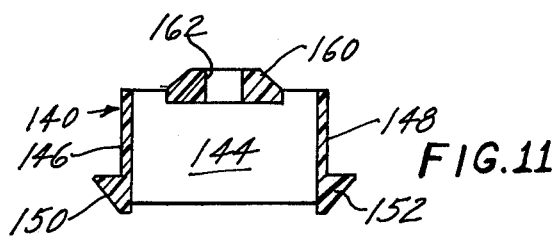
FIG. 11 is a sectional view taken along the line 11—11 of FIG. 8.

The lower edges of the sloping sides of the boss 160 are spaced from the side walls 146, 148, whereby the top of the element is formed with slots 170, 172 which are best seen in FIGS. 8 and 9. It is the provision of such slots that permits the flanges 150, 152 to be cammed into place without damage to the element. In this regard, it will be observed that the center portions of the side walls from which the flanges extend are movable. Without the slots 170, 172, the lower edges of such side walls would be capable of slight flexing because of the thinness of the walls. If the walls were quite high, such walls would flex enough to permit the flanges to cam into place in the frame.

However, for the typical window frame structure wherein space is limited, the provision of the slots 170, 172 assures that the side walls 146, 148 can flex sufficiently, even though such walls are relatively short, to permit the flanges to be cammed into place in the frame. The spring-like characteristic of such walls also causes the flanges to snap into interlocking relation with the frame.

The structure of the element of FIGS. 6–12 prevents the possible extraction thereof from the frame by the application of substantial lifting force on the sash to which it is secured. To this end, the end walls 142, 144 extending past the ends of the slots present non-deformable vertical plates to such force, even though such walls are thin. In this latter regard, the end walls undergo slight deformation when the flanges cam into place in the frame, and return to undeformed state when the flanges are in place. Thereafter, upward force on the sash cannot cause such walls to deform.

In the embodiment of FIGS. 6–12, it will be observed that the element has the lower edges of its side walls 146, 148 extending slightly below the lower edges of the end walls 142, 144. In one example, the side walls extend 0.0625-in. below the end walls. Such a feature may be employed to achieve flexing of the lower edges of the side walls to accommodate the inward movement of the flanges as they are cammed inward to ride along the inner faces of the confronting walls of the frame until they spring out in interlocking relation with the frame.

I claim:

1. In combination:
a frame having spaced straight and curved sections, and end sections connecting the ends of said straight and curved sections,
   each of said sections being a channel with walls each having inner and outer portions connected by a shoulder transition;
a sash having an upper rail extending into said curved section and a lower rail extending into said straight section, and stiles extending between and being connected with said rails;
respective weatherstrip means carried by said upper and lower rails and engaging the outer wall portions of said straight and curved sections;
and spaced guide and anti-lift elements secured to the bottom of said lower rail,
   each element having vertical sides with respective flanges extending laterally therefrom, said sides being characterized by spring action,
   and said flanges being located between said inner walls with said flanges in interference relation with said shoulder transitions.

2. The combination of claim 1, wherein said flanges have cam surfaces to engage the outer walls of said straight section and be cammed inwardly thereby to pass between said outer walls upon applying force to said sash during assembly,
the sides of said elements springing outwardly to cause said flanges to move to said inner walls and be in interfering relation with said shoulder transitions.

3. The combination of claim 1, wherein the bottom of said lower rail and the tops of said elements are in nesting relation.

4. The combination of claim 3, including screw fasteners extending through the tops of said elements, the bottom of said lower rail annd into said stiles.

5. The combination of claim 2, wherein each of said elements is a U-shaped element with said flanges extending from the lower ends of the sides thereof.

6. The combination of claim 2, wherein each of said elements is formed as a retangular box open at the bottom and with the flanges extending from the lower portions of opposite side thereof.

7. The combination of claim 6, wherein portions of each element are slotted to facilitate flexure of said opposite sides to accommodate inward camming of said flanges,
the remaining sides of each element being operable to prevent flexure of said opposite sides and withdrawal of said flanges from interlocked position by a lifting force on said sash.

8. The combination of claim 6, wherein the top of each of said elements has a center boss portion extending parallel to said opposite sides and between the remaining sides thereof,
the edges of said center portion being spaced from the top edges of said opposite sides thereof, and said center portion being adapted to be secured to the bottom of said lower rail.

9. The combination of claim 7, wherein said remaining sides of each element are also characterized by spring action.

10. The combination of claim 8, wherein the lower edges of said opposite sides of each element extend below the lower edges of said remaining sides thereof, said cam surfaces of said flanges extending to the lower edges of said opposite sides.

* * * * *